US006060028A

United States Patent [19]

Yoneda et al.

[11] Patent Number: 6,060,028

[45] Date of Patent: May 9, 2000

[54] APPARATUS FOR DRY FRACTIONATION OF FATS AND OILS

[75] Inventors: Shin Yoneda; Kiyoyuki Higuchi; Atsushi Taniguchi; Yuji Kuwabara, all of Izumisano, Japan

[73] Assignee: Fuji Oil Company, Limited, Osaka-fu, Japan

[21] Appl. No.: 09/287,335

[22] Filed: Apr. 7, 1999

Related U.S. Application Data

[62] Division of application No. 08/814,233, Mar. 11, 1997.

[30] Foreign Application Priority Data

Mar. 28, 1996 [JP] Japan .................................... 8-73486

[51] Int. Cl.[7] ........................................ B01D 9/00

[52] U.S. Cl. ........................................ 422/245.1; 422/253

[58] Field of Search ................................ 422/245.1, 251, 422/253

[56] References Cited

U.S. PATENT DOCUMENTS

| | | | |
|---|---|---|---|
| 3,617,382 | 11/1971 | Natsis et al. | 422/245.1 X |
| 4,795,569 | 1/1989 | Higuchi et al. | 210/770 |
| 5,401,867 | 3/1995 | Sitzmann et al. | 554/211 |
| 5,700,435 | 12/1997 | Bischof | 422/245.1 |

FOREIGN PATENT DOCUMENTS

| | | |
|---|---|---|
| 0262113 | 3/1988 | European Pat. Off. . |
| 0399597 | 11/1990 | European Pat. Off. . |
| 63-258994 | 10/1988 | Japan . |
| 2180253 | 3/1987 | United Kingdom . |
| 2220672 | 1/1990 | United Kingdom . |

*Primary Examiner*—William Powell
*Attorney, Agent, or Firm*—Wenderoth, Lind & Ponack, L.L.P.

[57] ABSTRACT

An apparatus for formation of fat crystals by standing, which has a container, distribution pipes and crystallization trays arranged in parallel, the container being divided into plural compartments with vertical partitions each upper part of which has an opening to permit a fat-and-oil feedstock to be fed into each compartment, the compartments communicating with each other at a certain height from the bottom of the container so that the fat-and-oil feedstock can be uniformly fed into respective compartments, and the distribution pipes being connected to the bottoms of respective compartments so that the fat-and-oil feedstock to be fed therein can be distributed to the crystallization trays, respectively.

1 Claim, No Drawings

APPARATUS FOR DRY FRACTIONATION OF FATS AND OILS

This application is a divisional application of Ser. No. 08/814,233 filed Mar. 11, 1997.

FIELD OF THE INVENTION

The present invention relates to a process for the dry fractionation of fats and oils, especially, laurin fats and oils.

BACKGROUND OF THE INVENTION

Fats and oils having high SFI (solid fat index) are effectively utilized by fractionation thereof into high and low melting point fractions. In general, high melting point fractions are more costly than low melting point fractions. In fact, for example, in case of palm kernel oil (PKO), since its high melting point fraction (PKS) is useful as a raw material for the production of a cocoa butter substitute (CBS) and the like, PKS is marketed at a higher price than a low melting point fraction (PKL) of PKO and PKL is even cheaper than PKO per se as a raw material for the fractionation. Then, for the fractionation of fats and oils having high SFI, in many cases, attempts have been made to increase the yields of high melting point fractions as high as possible efficiently.

At present, a representative process for the fractionation of palm kernel oil employed in the Malay Peninsula region is the dry fractionation, that is, fractionation of fats and oils without using any solvent, detergent or the like.

In the typical dry fractionation, PKO is pre-cooled to about 27° C. and distributed into many trays, followed by allowing it to stand at 18 to 21° C. for about 10 hours to crystallize, wrapping up the resultant cakes containing fat crystals with a filter cloth and subjecting the wrapped cakes to filtration under pressure (with a hydraulic press) to separate solids from a liquid phase ("SPECIALTY FATS VERSUS COCOA BUTTER" By Wong Soon, 1991). Hereinafter, this process is referred to as the conventional process.

In the conventional process, for increasing the yield of PKS, it is required to sufficiently carry out standing of pre-cooled PKO distributed into trays to increase the amount of fat crystals to be formed. On the other hand, this causes difficulties in filtration (separation of a liquid phase from solids) and, in order to recover fat crystals with good quality, it is necessary to press the cakes containing fat crystals under high pressure with a hydraulic press for a long period of time. However, there is a certain limit to an increase in the yield of PKS by this procedure. Then, the improvement of the conventional process is directed toward solving problems caused by intensive labor type steps as described below rather than to increase in the yield of PKS.

That is, the conventional process has been widely employed because of its low costs of facilities. However, a large number of trays are used in the standing step for crystallization (it is said that many as 10,000 to 20,000 trays are required for the facilities treating 100 ton of PKO per day). This step is very simple and trays are merely allowed to stand in a large room or space (to put trays on shelves). Then, un-uniform atmospheric temperatures of respective trays cannot be avoided and to control crystallization temperatures and time are difficult, which results in the problem that quality of products is apt to be inconsistent. In addition, there is such a defect that the filter cloth is apt to be worn out due to high pressure.

Furthermore, when the steps from the standing to the filtration under pressure are inspected in detail, various steps such as those for releasing the cakes containing fat crystals which are in the state of solid or semi-plastic from respective trays, wrapping them individually, transferring the wrapped cakes and then laying them up in a hydraulic press are required. However, these respective steps can hardly be automated and a great deal of labor is required. In fact, it is said that 70 to 80 persons are required for the facilities treating 100 ton of PKO per day. Therefore, from an economic viewpoint, the conventional process would no longer be realized except in such a region that considerably cheaper manpower is available.

If it were possible to transfer the cakes containing fat crystals after crystallization, an automatic filter press could be used instead of a hydraulic press because the slurry of cakes could be transferred into the filter press through a pipe line and filtered by the filter press. When a filter press can be used, such intensive labor type steps as wrapping the cakes with a filter cloth and laying it up in a hydraulic press can be eliminated. Then, some attempts have been made to employ a filter press. However, even if the cakes after full crystallization are crushed or smashed, a slurry having sufficient fluidity cannot be obtained and therefore the fatty material can hardly be transferred through a pipe line. Accordingly, at present, the amount of fat crystals to be formed is compelled to be controlled to maintain fluidability of slurry after crushing. That is, attempts for saving manpower are being made at the sacrifice of the yield of PKS.

OBJECTS OF THE INVENTION

In view of these circumstances, one object of the present invention is to provide an economic process for the dry fractionation of fats and oils which can save a great deal of manpower by employing a filter press without the sacrifice of the yield of PKS.

This object as well as other objects and advantages of the present invention will become apparent from the following description.

SUMMARY OF THE INVENTION

The present inventors have studied intensively based on recognition that to employ a filter press in the step for separating solids from a liquid phase is indispensable to save manpower and to obtain consistent quality of fractionated products. As a result, it been found that, by recycling a certain amount of a fractionated low melting point fraction obtained in the separation step and mixing it with a fat-and-oil feedstock, even if a sufficient amount of fat crystals are formed, a slurry of cakes containing the fat crystals and having good fluidity can be obtained and, surprisingly, yields higher than that of the conventional process can be achieved. Thereby, it has been also found that a pre-cooling temperature can be lowered to about a crystallization temperature and the crystallization time can be extremely reduced. Thus, the present invention has been completed.

That is, according to the present invention, there is provided a process for the dry fractionation of fats and oils which comprises providing a fat-and-oil feedstock having an SFI at 20° C. of at least 15; pre-cooling the fat-and-oil feedstock to a temperature of, at the highest, 3° C. higher than that of a cooling medium to be used for crystallization; allowing the pre-cooled fat-and-oil feedstock to stand while further cooling the feedstock with the cooling medium to form fat crystals and to obtain cakes containing fat crystals; and subjecting the cakes to separation of solids from a liquid phase.

DETAILED DESCRIPTION OF THE INVENTION

Fat-and-Oil Feedstock

The fat-and-oil feedstock to be used in the present invention is that having a high SFI at 20° C., especially, SFI at 20°

C. of 15 or higher, preferably, 20 or higher, more preferably, 30 or higher. Examples thereof include laurin fats and oils and hydrogenated fats and oils. A typical example of laurin fats and oils is palm kernel oil (PKO). In the present invention, the fat-and-oil feedstock is preferably mixed with a low melting point fraction and the fractionated low melting point fraction obtained from the separation step can be recycled for this purpose. A preferred proportion of the low melting point fraction to be mixed is 30% by weight or higher, preferably, 45% by weight or higher based on the total weight of the resulting mixture of the fats and oils feedstock and the low melting point fraction. When the mixing proportion is smaller than this range, the desired slurry as described hereinafter cannot be prepared and the desired advantages of the present invention are hardly expected. From a technical viewpoint, there is no upper limit of the mixing proportion. However, when the mixing proportion is too large (e.g., more than 70% by weight), it is undesirable because of an increase in a loading which accompanies an increase in costs of facilities.

A recycling technique of a liquid oil to a fat-and-oil feedstock is disclosed by JP-A 60-108498. However, this technique relates to the effective production of a liquid oil from a fat-and-oil feedstock having a low SFI and completely different from the present invention where the yields of solid fats are improved.

Pre-cooling

For preventing wintering, the fat-and-oil feedstock is normally kept in a melted state with warming in a tank, for example, at 40° C. or higher in case of PKO. This is pre-cooled with a heat exchanger or the like. The pre-cooling can be carried out with any known heat exchanger to a temperature of, at the highest, 3° C. higher than, preferably 1° C. higher than a temperature for the formation of fat crystals by standing (cooling medium temperature). More preferably, the pre-cooling is carried out to a temperature of equal to or desirably, 1° C. lower than the crystallization temperature, or lower. The pre-cooling is preferably carried out at a temperature of, at the lowest, 5° C. lower than the crystallization temperature, at which no clear crystallization takes place, for a relatively short period of time.

For adjusting a pre-cooling temperature to the above-described temperature, in practice, recycling of a fractionated low melting point fraction is required. When the recycling is not carried out, blockage of a heat exchanger is caused by growth of crystals with the lapse of continuous treatment because of a high concentration of crystallizable components, which makes a reliable cooling operation difficult.

Allowing to Stand for Formation of Fat Crystals

The pre-cooled fat-and-oil feedstock optionally mixed with a low melting point fraction is distributed into trays and allowed to stand to form fat crystals. The distribution into each tray is preferably carried out within a short period of time with uniform distribution of crystals. In case of distribution of a large amount of the pre-cooled fat-and-oil feedstock (or a mixture thereof with a low melting point fraction) within a short period, one of preferred methods is to divide the pre-cooled fat-and-oil feedstock in a large container into small portions with vertical partitions and to distribute the portions in parallel into crystallization trays arranged in a multi-stage shelf. More specifically, for example, a large container is divided into small spaces with vertical partitions which communicate with each other at a certain height from the bottom of the container to form several compartments. Each compartment has an upper opening from which the pre-cooled fat-and-oil feedstock is distributed into the compartment. The fat-and-oil feedstock is poured into the large container and is over-flowed from the upper part of compartments to uniformly fill up respective compartments. Thus, the feedstock is uniformly divided into small portions. Then, the feedstock divided into small portions are fed into crystallization trays in parallel and simultaneously through distribution pipes connected to the bottoms of respective compartments (each distribution pipe is provided with a valve which can open and close in parallel with other valves by a mechanical or electronic means). When one distribution pipe is used to distribute a large amount of the pre-cooled feedstock or a mixture thereof with a low melting point fraction into plural trays one by one (the conventional process has employed such method that a pre-cooled fat-and-oil feedstock is distributed into a tray placed on an uppermost stage to overflow from the tray to other trays placed on lower stages one by one), this procedure is time-consuming and crystallization takes place during the distribution, which varies quality and, in extreme cases, makes the distribution difficult.

After completion of distribution, the formation of fat crystals is carried out by allowing the trays to stand with the aid of a cooling medium at 18 to 21° C. When air adjusted to a certain constant temperature is ventilated from the side of trays placed on a multi-stage shelf, in comparison of allowing to stand as such without any cooling medium, more constant and reliable crystallization can be carried out. Although the cooling medium is not limited to air, when a liquid cooling medium is used, more precise temperature control is required because of its larger thermal conductivity. In addition, as described hereinafter, since the time requiring for formation of fat crystals can be reduced by pre-cooling and using a cooling medium, it is possible to carry out continuous crystallization by placing trays on a conveyer without any large-scale facilities.

The formation of fat crystals is carried out by allowing the trays to stand until the iodine value (IV) of a fractionated low melting point fraction (palm kernel olein) reaches about 23 or higher in case of PKO. Even if the crystallization by standing is carried out until the IV reaches 25 or higher, the desired slurry can be prepared by subsequent crushing or smashing and therefore the high yield of PKS can be achieved. Normally, the time required for the crystallization by allowing the trays to stand can be reduced to 4 to 6 hours, while trays are generally allowed to stand for about 10 hours for crystallization in the conventional process. It is considered that this reduction of the time required for the crystallization is resulted from a synergistic effect of improvement in the emission efficiency of latent heat of crystallization due to convection of a system which is facilitated by a higher content of liquid components of the system as well as formation of nuclei for crystallization in the early stage due to the low pre-cooling temperature.

Crushing or Smashing

After the crystallization, cakes containing fat crystals are taken out of the trays and passed through a crusher. The cakes passed through the crusher become a slurry having fluidity. Therefore, it can be transferred to the pressing step through a pipe line. The crushing or smashing can be carried out by a per se known method such as, for example, that disclosed in JP-A 2-14290.

Pressing and Separation of Solids from Liquid Phase

The separation of solids from a liquid phase can be carried out by a per se known method. As described above, the cakes containing fat crystals are in the form of a slurry, which can be transferred through a pipe line, which makes it possible to utilize a filter press which is efficient and suitable for automation.

By this separation step, the fat-and-oil feedstock is fractionated into high and low melting point fractions. The yield of the high melting point fraction is higher than that of the conventional process and quality thereof is the same as or higher than that of the conventional process.

Since the low melting point fraction thus fractionated is recycled and mixed with the fat-and-oil feedstock, the amount to be treated is increased so much. However, the low melting point fraction is a liquid component and readily passes through a filter cloth. Then, it scarcely effects the treating time.

The following Examples and Comparative Examples further illustrate the present invention in detail but are not to be construed to limit the scope thereof. In the Examples and Comparative Examples, all the "percents" are by weight unless otherwise stated.

EXAMPLE 1

RBD-PKO (refined bleached deodorized—palm kernel oil, SFI at 20° C.: 39) heated at 40° C. (75 liters) was placed in a jacketed pre-cooling tank and cooled with stirring to 21° C. by passing cold water at 14° C. through the jacket. Then, it was distributed into stainless trays each of which was 100 cm in length×150 cm in width×8 cm in height in an amount corresponding to 50 mm deep. The trays were cooled by ventilating cold air at 21° C. on both upper and bottom surfaces of respective trays at a rate of 3 m/sec for 4 hours. The solidified oil was crushed to prepare a slurry and pressed into a filter press having filtration chambers 15 mm thick. The slurry was pressed at the maximum pressure of 30 kg/cm$^2$ for 30 minutes to separate solids from a liquid phase. Then, IV values of PKS and PKL were analyzed. As a result, the IV values were 6.98 and 22.7, respectively (see Table 1). Since the yield was as low as 29.9, the same procedure was repeated except that the cooling was carried out for 6 hours. As a result, the yield was increased to 33.1. However, the slurry had less fluidity and, although the filter press was barely used, the industrial scale production by using this procedure would be considered to be difficult.

EXAMPLE 2

RBO-PKO (48.8 liters) heated to 40° C. and PKL (26.6 liters) were mixed and placed in a jacketed pre-cooling tank and cold water at 14° C. was passed through the jacket to cool to 21° C. Then, the mixture was worked up according to the same procedure as that described in Example 1. The results are shown in Table 1.

EXAMPLE 3 AND COMPARATIVE EXAMPLE 1

Difference in cooling temperatures was investigated. Namely, RBO-PKO (37.5 liters) heated to 40° C. and PKL (37.5 liters) were mixed and placed in a jacketed pre-cooling tank and cold water at 14° C. was passed through the jacket to cool to 20° C., 22° C., 24° C. or 27° C. Then, the mixture was worked up according to the same procedure as that described in Example 1. The IV values of the resultant PKS fractions were 6.52, 6.55, 6.51 and 7.52, respectively and the IV values of the resultant PKL fractions were 25.6, 25.5, 25.2 and 24.6, respectively (see Table 1).

These results suggest that, when the pre-cooling temperature is lower, the crystallization time becomes shorter.

EXAMPLE 4

According to the same procedure as that described in Example 1, the fractionation was carried out except that 70% by weight of PKL was mixed with PKO. The results are shown in Table 1. As a reference, the estimated values of the conventional process are also shown in Table 1.

TABLE 1

| | Mixing proportion of PKL (%) | Pre-cooling end temp. (° C.) | Crystallization time (hours) | IV of PKS | Yield of PKS (%) | IV of PKL |
|---|---|---|---|---|---|---|
| Ex. 1 | 0 | 21 | 4 | 6.98 | 29.9 | 22.7 |
| " | 0 | 21 | 6 | 7.19 | 33.1 | 23.5 |
| Ex. 2 | 35 | 21 | 4 | 6.22 | 30.9 | 23.5 |
| " | 35 | 21 | 6 | 6.55 | 35.9 | 25.0 |
| Ex. 3 | 50 | 20 | 6 | 6.52 | 39.8 | 25.6 |
| " | 50 | 22 | 6 | 6.55 | 39.1 | 25.5 |
| " | 50 | 24 | 6 | 6.51 | 36.4 | 25.2 |
| Comp. | | | | | | |
| Ex. 1 | 50 | 27 | 6 | 7.52 | 32.8 | 24.6 |
| Ex. 4 | 70 | 19 | 1.5 | 6.61 | 30.7 | 25.0 |
| Conventional | 0 | 27 | 10 | 7.0–7.5 | 32.0 | 23.0 |

As described hereinabove, a filter press can be employed in the dry fractionation of fats and oils by recycling a low melting point fraction and lowering a pre-cooling temperature. Thereby, it is possible to save manpower and to obtain products having consistent quality. In addition, it is possible to improve the yields of PKS more than that of the conventional process.

What is claimed is:

1. An apparatus for formation of fat crystals by standing which comprises a container, distribution pipes and crystallization trays arranged in parallel, said container being divided into plural compartments with vertical partitions each upper part of which has an opening to permit a fat-and-oil feedstock to be fed into each compartment, said compartments communicating with each other at a certain height from the bottom of said container so that said fat-and-oil feedstock can be uniformly fed into respective compartments, and said distribution pipes being connected to the bottoms of respective compartments so that said fat-and-oil feedstock to be fed therein can be distributed to said crystallization trays, respectively.

* * * * *